United States Patent [19]

Williams

[11] Patent Number: 5,675,733

[45] Date of Patent: Oct. 7, 1997

[54] STATISTICAL ANALYSIS AND DISPLAY OF RECEPTION STATUS OF ELECTRONIC MESSAGES

[75] Inventor: Marvin L. Williams, Lewisville, Tex.

[73] Assignee: International Business Machines Corporation, Armonk, N.Y.

[21] Appl. No.: 511,938

[22] Filed: Aug. 7, 1995

Related U.S. Application Data

[63] Continuation of Ser. No. 983,201, Nov. 30, 1992, abandoned.

[51] Int. Cl.$^6$ .................................................. G06F 13/00
[52] U.S. Cl. .................................................. 395/200.01
[58] Field of Search ........................................ 395/200.01

[56] References Cited

U.S. PATENT DOCUMENTS

| | | | |
|---|---|---|---|
| 4,994,985 | 2/1991 | Cree et al. | 364/514 |
| 5,040,141 | 8/1991 | Yazima et al. | 364/400 |
| 5,057,935 | 10/1991 | Williams | 358/402 |
| 5,093,918 | 3/1992 | Heyen et al. | 395/200.08 |
| 5,123,089 | 6/1992 | Beilinski et al. | 395/200.01 |
| 5,125,075 | 6/1992 | Goodale et al. | 395/200.16 |
| 5,136,690 | 8/1992 | Becker et al. | 395/161 |
| 5,231,593 | 7/1993 | Notess | 364/550 |
| 5,245,532 | 9/1993 | Mourier | 364/400 |
| 5,261,052 | 11/1993 | Shamamoto et al. | 395/200.01 |
| 5,396,537 | 3/1995 | Schwendeman | 379/57 |
| 5,424,724 | 6/1995 | Williams et al. | 340/825.05 |
| 5,438,660 | 8/1995 | Lee et al. | 395/155 |

*Primary Examiner*—William M. Treat
*Assistant Examiner*—Kenneth R. Coulter
*Attorney, Agent, or Firm*—Whitham, Curtis, Whitham & McGinn; Edward H. Duffield

[57] ABSTRACT

A confirmation of delivery message display enhancement provides user definable correlation and/or statistical summaries of numerous confirmation of delivery (COD) acknowledgement messages corresponding to requested, automatically generated acknowledgements of receipt of electronic mail messages. The format of the multimedia display is user-definable and selectively provides detail information with expanded icons or overlaid windows. Performance of user specified or default processing of COD information is initiated by receipt of each COD message by the sender and the resulting summary and correlation is displayed at the will of the operator. Animation of display templates is also provided to assist in understanding of patterns of COD messages. A preferred embodiment includes transmission of user-defined information with a message (or local storage thereof) which is accumulated when the information is returned with (or locally accessed in response to) a COD message.

15 Claims, 9 Drawing Sheets

STATISTICAL ANALYSIS AND DISPLAY OF RECEPTION STATUS OF ELECTRONIC MESSAGES

This application is a continuation of application Ser. No. 07/983,201, filed Nov. 30, 1992 now abandoned.

BACKGROUND OF THE INVENTION

1. Field of the Invention

The present invention generally relates to electronic mail arrangements and, more particularly, to display of confirmation of delivery information regarding electronic mail messages.

2. Description of the Prior Art

The development of computer networks and the ability for digital communication between data processors over communication utilities such as telephone links has enabled new forms of communication such as the transmission of documents by facsimile and electronic mail. Electronic mail, at its most basic, merely calls for the transmission of a digital, usually encoded, file from one data processor terminal to another and storage at the receiving terminal. At any time thereafter, the operator of the receiving terminal may call the message from memory for display, printing or any other available function available for action on a local file, including forwarding to another terminal with or without modification of the text. In order to alert a recipient that a message has arrived, it is also common to provide for automatic display of messages in regard to any electronic mail which is received. Further, menu-driven electronic mail processing functions are now relatively common.

Since any data processing function can be performed on the text of electronic mail, the nature of the transmitted file is irrelevant, as long as it is susceptible of digital transmission. Therefore electronic mail may include graphical images in digitized form as is done by facsimile machines or scanners. As used herein, the term "electronic mail" will be used as comprehending all types of digital files which can be sent between data processor terminals based upon addresses of either users, terminals or other network addresses (e.g. nodes).

Because of wide variety of files which may be transmitted in this manner by merely specifying an address and the functions which can be performed thereon or in response thereto, including automatic functions, electronic mail has become extremely popular and volume in some networks is quite substantial. It has been found that electronic mail is an effective business management and information dissemination tool. In such a context, it has become common to provide for mailing lists under the control of each terminal in order to facilitate the transmission of an electronic mail (hereinafter "e-mail") file to a plurality of addressees. These mailing lists may be arbitrarily large. Therefore, a single e-mail file may be greatly multiplied, in effect (a file may not be physically multiplied within a node of the system, but only made accessible to certain addressable terminals on that node), in accordance with the number of addressees on a particular mailing list. The message may be further multiplied by each addressee as copies are saved, forwarded (with or without addition, notation or editing) or otherwise acted upon by the addressee. This multiplication of the e-mail file may continue to any arbitrary degree during the dissemination of the message.

A common facility provided in e-mail systems is the ability to automatically generate acknowledgements, commonly referred to as confirmation of delivery (COD) messages, at the will of the sender. Usually, the automatic generation of an acknowledgement requires only the insertion of a short combination of characters in a line of the message. When this code is encountered when the file is retrieved by an addressee, the acknowledgement, often including the user identification (user ID) and the date and time of access, is generated and sent as a separate e-mail message to the sender. At the sender terminal, information in the COD message is formatted with a locally stored form message for display to the sender. Thus the sender can know when the message is actually received by calling the acknowledgement e-mail file. Acknowledgements may also be generated from other mail functions available to the user such as file (store), print, delete, etc. and the particular mail function generating the acknowledgement can also be reported to the sender. Other automatic acknowledgement functions are also available, such as acknowledgement of receipt and storage by a node so that the e-mail file is at least available to the addressee. Another possible stage of acknowledgement may be when a message indicating the notification of the addressee by an automatically generated message. In short, any incident of delivery of an e-mail file may be separately reported automatically to the sender.

However, these acknowledgement e-mail messages, of course, are individual messages since they are individually generated upon each access or automatic function performed in response to the existence of received e-mail. Generation of these acknowledgements may be made to follow a file throughout the entirety of the dissemination of the message. Therefore, the volume of acknowledgement messages may easily become quite large. Consider a worldwide data processing network in which an executive wished to transmit a message concerning, say, an implementation of a new company policy to the managers of a particular department at all installations in Europe and the United States and to have the message distributed through three supervisory levels below the manager through the nested distribution lists at each supervisory level. This degree of message dissemination, possibly involving even more nested distribution lists than the sender may know (if individual addressees have specified automatic distribution lists), might include as many as ten thousand individuals or, potentially, many more. If implementation of this policy would be effective upon receipt of the message, the manager would wish to track receipt of the message in order to determine implementation of the new policy. In the prior art, there has been no provision for reporting of acknowledgements other than on an individual basis, thus potentially requiring the sender to sift through as many acknowledgement messages as the number of addressees to whom the message was sent. Even viewing a listing of recipients is a tedious process under such circumstances and providing more individual information than is likely to be useful. More likely, the executive may want to know, instead, the percentage of addressees which have access to the message (or how many and which nodes of the network have received and stored the message) and the percentage of addressees which have actually accessed the message. Often, it is the number of individuals at a particular management level or levels who are aware of the information which determines the effectiveness of the information. While this information is available to the sender, at the current state of the art, it can only be extracted from the individual acknowledgement messages by manual browsing and sifting procedures.

SUMMARY OF THE INVENTION

It is therefore an object of the present invention to provide an arrangement for collecting, sorting and compiling statistical summaries of message acknowledgement data.

It is another object of the invention to provide for presentation of correlated acknowledgement data in a multimedia display format, substantially in real time.

It is a further object of the invention to provide improved ease and speed of access to information concerning information dissemination.

It is yet another object of the invention to provide a user definable multimedia display format for presentation of correlations of data and statistical summaries and to allow superposition of other useful information thereon for enhancement of user understanding of the information presented.

In order to accomplish these and other objects of the invention, a combination is provided including a network of data processing terminals, the network being capable of transmitting messages between terminals and including means for generating confirmation of delivery messages in response to a request therefor, a source of information concerning users of the network, a correlation service for accessing information from the source of information in response to data contained in a confirmation of delivery message, and means for accumulating information, by categories, accessed from the source of information.

In accordance with another aspect of the invention, a method is provided for displaying confirmation of delivery information to an operator of a terminal of a network capable of selectively transmitting messages between respective terminals connected by the network and generating confirmation of delivery messages in response to an access to a message transmitted between terminals of the network, comprising the steps of accessing information in response to contents of at least one confirmation of delivery messages, accumulating information accessed by the accessing step, and generating at least one of a visual display and an audible indication to an operator in response to information accumulated by the accumulating step.

In accordance with a further aspect of the invention, a method is provided for displaying confirmation of delivery information to an operator of a terminal of a network capable of selectively transmitting messages between respective terminals connected by the network and generating confirmation of delivery messages in response to an access to a message transmitted between terminals of the network, comprising the steps of accessing information in response to a distribution list for a message, attaching the information to a distribution identifier address of said message, accumulating information attached to said distribution identifier address, and generating at least one of a visual display and an audible indication to an operator in response to information accumulated by the accumulating step.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
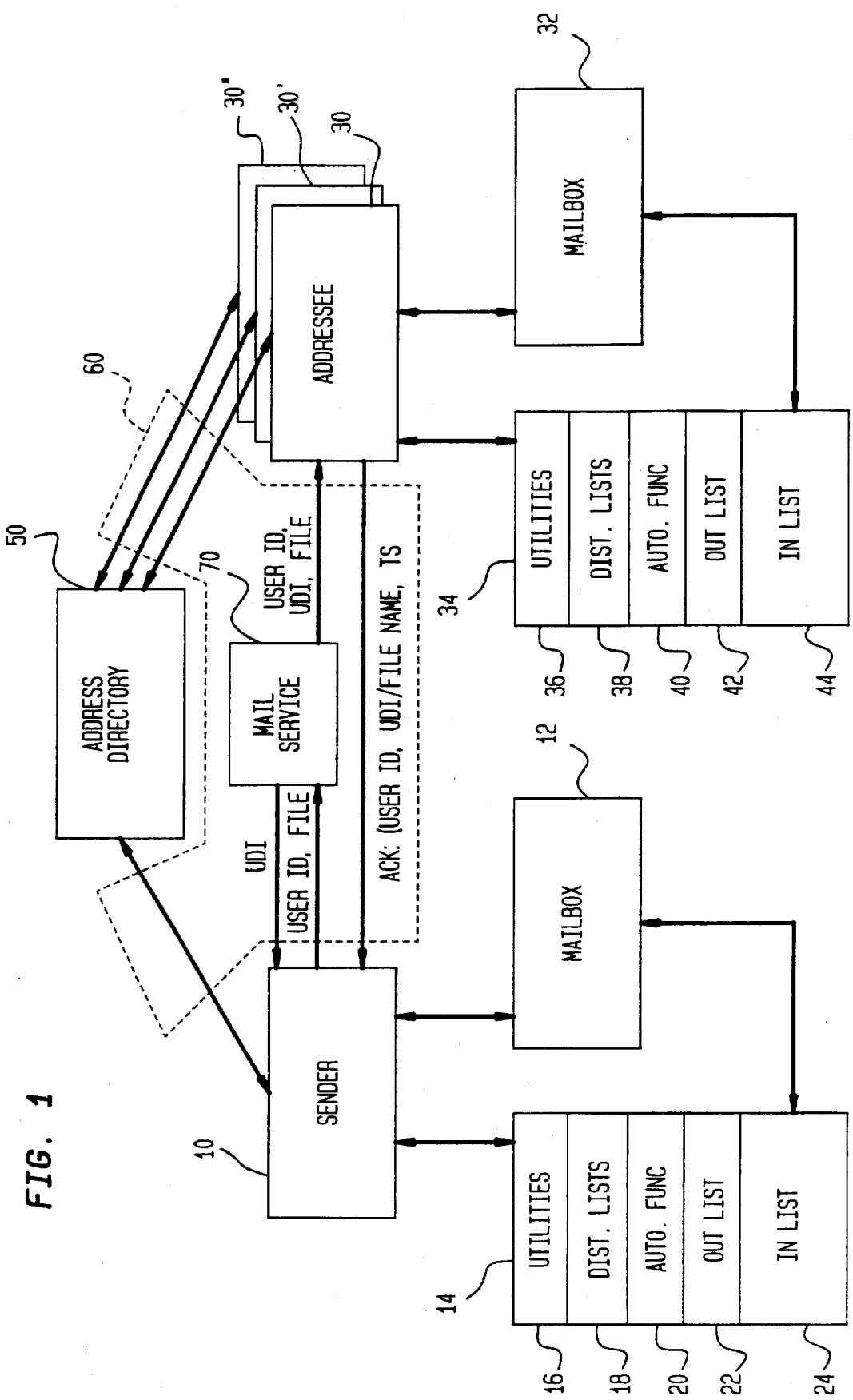
FIG. 1 is an organizational block diagram depicting the function operations involved in sending an e-mail message over a network.

Referring now to the drawings, and more particularly to FIG. 1, there is shown, in block diagram form, a portion of a data processing network supporting the transmission of an e-mail message. FIG. 1 is specifically not admitted to be prior art as to the present invention although many of the individual elements depicted therein are well-known. The essential elements, of course, are a sender terminal 10, a receiver terminal 30 and a communications network 60. An address directory 50 may or may not be provided either locally (e.g. local to the terminal), centrally or distributed over a plurality of network nodes. Communication with address directory 50 over the network is depicted since it is usual for such communication to involve some portion of the network. The architecture or distribution of such a directory is irrelevant to the practice of the invention and the depiction is intended as generic to all such directory architectures and arrangements. As will be discussed in greater detail below, however, it is important to the practice of the invention that access to address or user ID information be available at any terminal at which the invention is to be practiced.

As part of the communications package, preferably including a modem or other network interface, not shown, and suitable software to control the same, each terminal or, more preferably, each user identification (user ID) will have access to a mailbox 12, 32, usually in the form of a directory having limited accessibility. Associating mailboxes with user ID's or allowing access based on user ID's rather than on a terminal-by-terminal basis allows a user to access his mailbox from any terminal connected to the system. The communications package will preferably also include a group 14, 34 of files or dedicated memory areas including file management utilities 16, 36 for composing messages to be sent and saving and deleting messages which have been received, user defined distribution lists 18, 38 user defined automatic functions 20, 40 (e.g. for automatic forwarding of messages (e.g. to supervisors), and possibly a log of outgoing mail 22, 42 or other functions (e.g. spell check and thesaurus functions), as may be desired and a list of incoming messages 24, 44 which serves as a directory of received e-mail files contained in each respective mailbox 12, 32.

Figure 2:
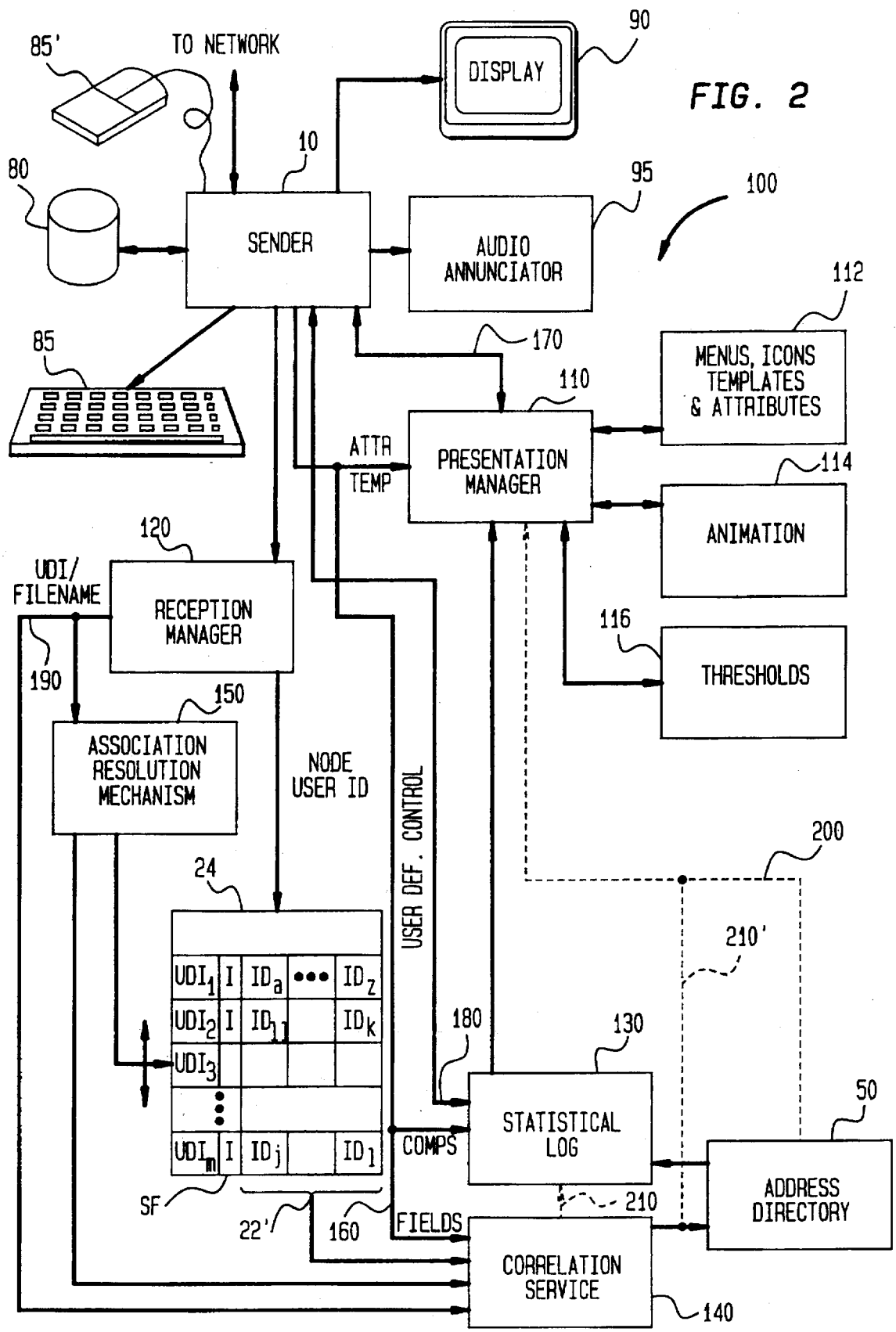
FIG. 2 is a more detailed block diagram of the sender portion of FIG. 1 showing an implementation of the invention in basic form.

It should be remembered that FIG. 1 represents a network and that a message may involve a plurality of addressees 30, 30', 30", etc., each of which will include access to address directory 50 and the functional counterpart of file groups 14, 34 and mailboxes 12, 32. In this regard, it should be noted that the architecture of the system is depicted in FIGS. 1 and 2 in a manner which will facilitate an understanding of the invention rather than seeking to convey any preference concerning actual system architecture to be employed in the practice of the invention. In fact, it is preferable for reasons unrelated to the invention to provide mailboxes 32 and storage for files 34 on a "per node" basis for terminals 30, 30', 30", etc. in the network. For the network or a node of the network, it is also preferable for reasons of transmission logging rather than for purposes of the invention to provide a centralized mail service facility 70 but which is not necessary to the practice of the invention.

When, for example, sender 10 uses utilities 16 to compose and send a message, the file and addressee identifier, such as a user ID or a plurality thereof corresponding to specified addresses or one or more distribution lists 18 or both are sent to the mail service (or directly to the addressees or the nodes of the system on which the addressees reside). If the mail service 70 is present, the transmission will provoke the generation of a unique distribution identifier (UDI) which may consist simply of a time stamp (TS) concatenated with the user ID of the sender to form a UDI since only one user may initiate a distribution at any instant on the network, as an incident of network protocols. This UDI is sent to sender 10 as an acknowledgement of access to the network. In accordance with the invention, upon receipt of a UDI (or some other acknowledgement of network access), the sender develops and stores a list of addressees for the e-mail message illustrated as out list 22. This out list 22 contains all the addressees specified for the e-mail message and forms a data structure which will be used in the practice of the invention as will be discussed in greater detail below.

The message which proceeds to one or more addressees or addressee nodes continues to contain the user ID and the file. The UDI may be transmitted as well if mail service 70 is present in the network. As is common with most transmission systems, and digital transmission systems in particular, numerous arrangements for monitoring the progress of the transmission are provided such as by answer-back types of acknowledgement for correct or corrupted transmission. If a corrupted transmission is detected, packets of the digital transmission can be repeated at the sender under control of the answer-back signal. Answer-back signals are also sent for correct reception of data to insure transmission system integrity. It is therefore contemplated that the invention will be responsive to at least some of these acknowledgements in the same manner as confirmation of delivery (COD) acknowledgements which are automatically sent as e-mail messages when an addressee accesses the e-mail message sent. Therefore, it will be sufficient for an understanding of the invention to describe the operation of the invention in response to COD messages.

Referring now to FIG. 2, the major elements of the system for providing enhanced COD information display is shown for one terminal 10, 30 of the network. The sender terminal 10 preferably includes a local storage unit 80 such as a floppy disk or hard disk, a keyboard 85 and mouse 85' input devices, a preferably color display 90 and an audio annunciator 95. The audio annunciator 95 may be simply a tone generator and speaker but could include a speech synthesizer, all of which are, themselves, known in the art in combination with computer terminals.

The major functional elements of the system for carrying out the invention are a presentation manager 110, a reception manager 120, a statistical log 130, a correlation service 140 and an association resolution mechanism 150. The presentation manager is a display controller which includes storage for default and user-defined templates or background video patterns 112 and video attributes which are to be applied to the background templates, preferably as attributes, animation sub-routines or devices 114 and thresholds 116 which are to be applied to data for control of video attributes. The reception manager 120 receives COD messages, discriminating them from other e-mail messages, and controls operation of the correlation service in response thereto. The correlation service 140 establishes which information concerning the user causing the generation of the COD message is of interest to the sender of the e-mail message based upon previously entered user definitions. The correlation service 140 also obtains that information from address directory 50 and causes it to be returned to the statistical log 130 which accumulates the information of interest and may perform user defined computations thereon.

The details of these functional blocks is relatively unimportant to the invention. For example, the correlation service 140 is basically a look-up table. Similarly, statistical log 130 functions basically in the nature of a spreadsheet calculator. However, in combination, the correlation service 140 dynamically defines variables for the statistical log and controls presentation of data thereto. Similarly, association resolution mechanism 150 also functions as an address conversion arrangement which could be done with a look-up table. Presentation manager 110 is a display generator capable of merging a plurality of inputs and delivering an encoded video signal using components and techniques that are individually well-understood in the art. An exemplary hardware embodiment will be discussed in detail with reference to FIG. 11 to convey an understanding of the invention but the details thereof are not critical to the invention and many other arrangements in hardware, software or a combination thereof will be evident to those skilled in the art in view of the following description of the operation of the invention.

Figure 3:
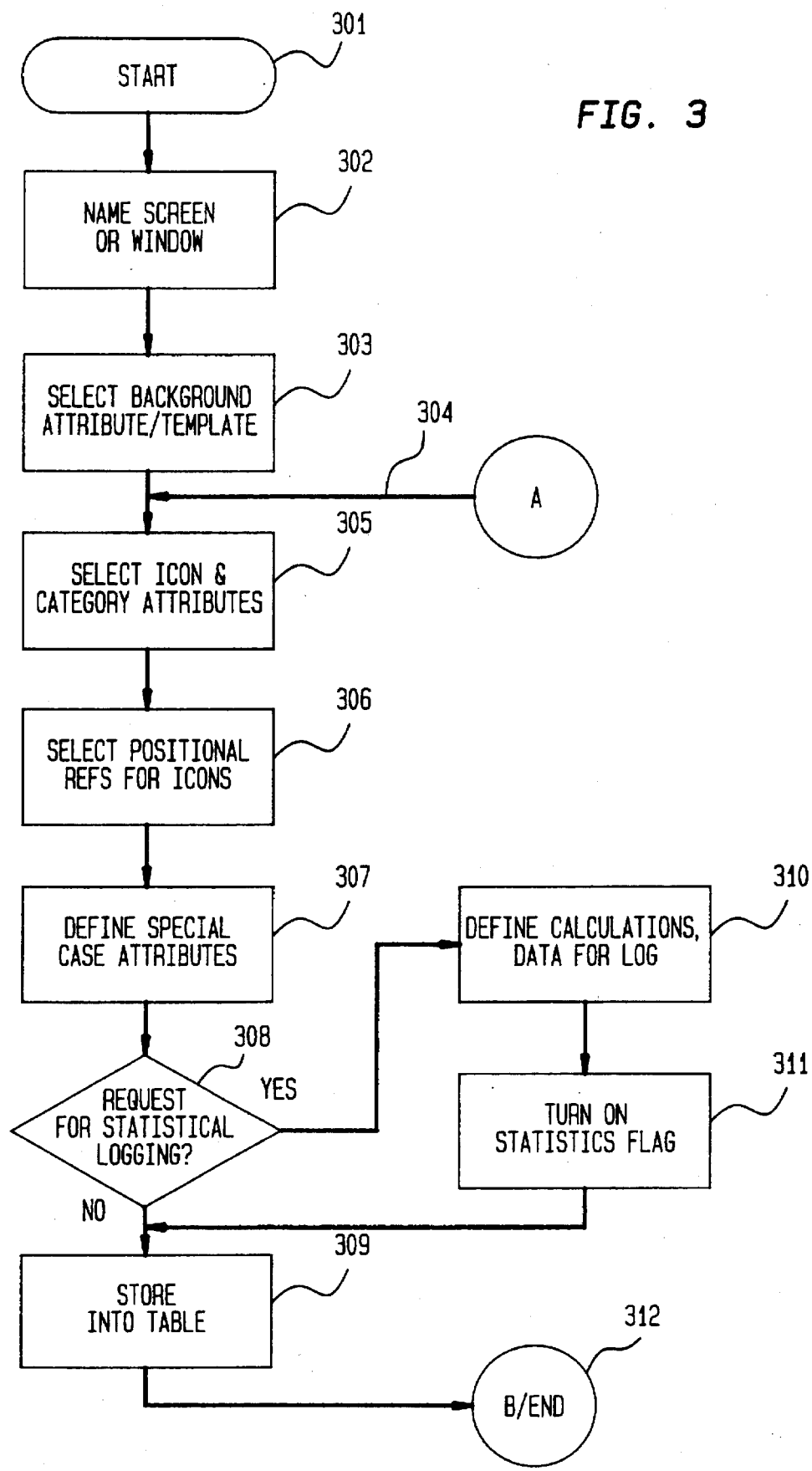
FIG. 3 is a flow diagram illustrating user definition of enhanced COD message reports in accordance with the present invention.

It is important to the ability of the invention to present data which is useful to the operator that the invention permit the response to COD messages to be user-defined. This procedure will now be discussed with reference to FIG. 3. The operation of the invention to implement the response definitions provided by the user will also serve as introduction to the functions and relationships of structure illustrated in FIG. 2. The operations depicted in FIG. 3 are executed over control connection 160 of FIG. 2.

When a user is confronted with the sending of a message which will involve a large number of COD replies and wishes to provide an enhanced summary display of the progress of receipt of such replies, a registration procedure is started at 301. A name for the screen or window to be produced is provided by means of keyboard 85 and background display attributes (e.g. color, texture, etc.) and a template are selected at 303 to correspond to the screen or window name. Templates are preferably in the form of a skeleton map such as of the world, a country, business facility, isometric view of a building or the like. However, organizational charts may also be advantageously used in some instances. In any case, a template is basically any graphic design which may be of assistance to an operator in assimilating information displayed in a format related thereto and need be no more than a pattern of video bits simulating an overlay.

At step 305, the operator may specify attributes for categories of information of interest. For example, if the operator is interested in the response of different departments to which an e-mail message is to be sent, they may be differentiated by colors or audio signals or both, such as red for the planning department, green for marketing and blue with an audio tone or synthesized voice message for engineering or product development personnel. At this step also, the operator may select an icon, preferably from a library of prepared icons for presentation of the display. The icons may be of any form or design which will express the number of correlations of data which are of interest. For example, if comparison of department response is important an icon in the form of a histogram such as that shown in FIG. 9 may be appropriate. A matrix using thresholds to change color at a predetermined (e.g. 50%) value could be used to indicate departments and supervisory levels within departments. Overlaid pie charts such as in FIG. 10 could also be used with or without video (e.g. attribute alteration) or audio signals to display a plurality of categories. In contrast, for more simple cases, such as indicating receipt by anyone at each of a plurality of locations, simple colored dots could be used for the icon and thresholds set to alter color when 0% reception was exceeded. While it is anticipated that only a single type of icon will be used for better visual comparison, in theory, a plurality of icons could be used, particularly in a case where several different combinations of categories were of interest. These definitions of template, attributes, icons and thresholds are all stored in the presentation manager 110 for control thereof.

The positional location of each icon is then defined at step 306 and stored in presentation manager 110. This is preferably provided under control of a mouse 85' and a correlation parameter is associated therewith and stored in the correlation service 140 and as a variable identifier in statistical log 130. The correlation parameter is contemplated as usually being a geographical identifier which will correspond to a position on a selected template and reflect a network node or facility. However, other categories such as departments might be useful in connection with an organizational chart template. The simultaneous definition of a template location in the presentation manager 110 at which an icon will be displayed, a category of interest in correlation service 140 of COD messages for sorting of COD return data and variable identifier in statistical log 130 provides for separation of data and correct direction of data to be reflected in the display of each icon.

Next, at step 307, special case attributes are defined for particular addressee user ID's or special categories of addressees, such as providing for an audio indication for high level managers, special colors for vendors and the like. These special attributes are similarly stored in at least the presentation manager 110 and correlation service 140. In many cases it will be desirable to omit these special case responses from any statistical summaries and inclusion or omission may be accomplished by appropriate storage in statistical log corresponding to a unique variable identifier or a variable identifier which will cause grouping with other responses for summarization.

In most cases, it is contemplated that the function of statistical log 308 will merely be that of summation of categories of responses, which the invention provides as a default, it is possible that more complex numerical analysis and summation will be desired. If such calculations are requested by the user, the request is detected at 308, the calculations defined by the operator at 310 and a statistics flag set to activate the calculations at 311. As will be seen in the following discussion of FIG. 4, the logging of CODs is preferably done upon the receipt of each COD to reduce response time of the system when the COD status display for a message is requested. The use of a flag greatly reduces the computational overhead for CODs which do not require the calculation or calculations specified. Once all the desired definitions have been specified by the user or by default, the registration process is completed to define the desired display screen or window by storage at step 309, preferably in storage means 80, from which it is recalled as needed.

Figure 4:
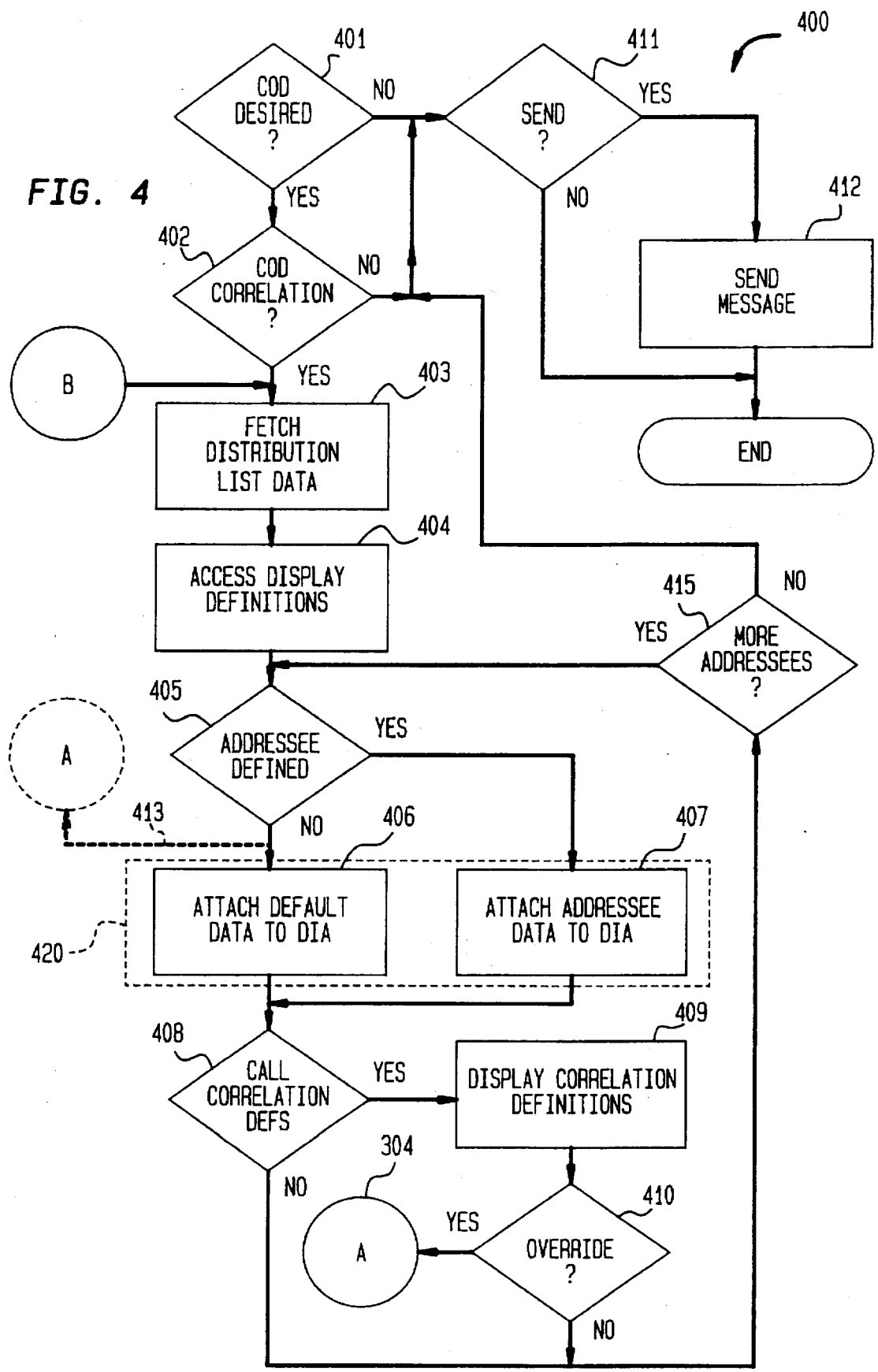
FIG. 4 is illustrates operation of the invention at the time of sending an e-mail message.

As indicated by alternative entry and exit from the registration process, as indicated at 304 and 312, the registration process is initially done at the will of the operator but may be re-entered under the control of the invention as will now be described with reference to FIG. 4. When an e-mail message to be sent has been composed, detection of the presence of an acknowledgement or COD request is detected from the note in a manner known in the art for generating a COD at a receiving terminal 30. Detection at the sender, however, in accordance with the invention, initiates a review 400 of the distribution which will occur but may not be fully known to the sender. This procedure also discovers instances where information which will be relied upon by the statistical log and could thus cause reporting errors. If no COD is requested, of course, the send routine which includes waiting for a send command, detected at 411, and the execution of that command 412 may proceed as in prior e-mail systems. Likewise, if there is to be no correlation of CODs requested, detected at 402, the invention causes branching at 402 and the send routine may proceed. However, if correlation of COD data is requested, the distribution list data is fetched from address directory 50 at 403 and the display definitions are accessed at 404. Then at 405 each addressee is checked to determine if the information to be used is available and to require a viable definition for it if the information is not available by branching to "A" of FIG. 3 if it is not, as shown by dashed line and circle 413 in FIG. 4. Steps 406 and 407 are optional as indicated by dashed line 420 and will be discussed below as a preferred variation of the invention. If the defined information is available for the addressee and the process is not interrupted at 408, all addressees will be checked in turn, looping at 415, including all nested distribution lists controlled by the addressees in the distribution list specified by the sender. If any data required by the definitions is unavailable for any of the addressees which will actually receive the message, the disposition of COD data corresponding to such addressees is forced by branching to a portion of the registration process of FIG. 3. Since either the presentation definitions may be changed or the data handled as a special case, it is preferable to reinitiate the comparison procedure by re-entering the process of FIG. 4 as indicated at "B". However, as will be understood by those skilled in the art, definition of a special case could be detected and appropriate branching provided to re-enter the process within the loop at 405 to avoid re-checking of addressees already checked.

This checking operation can be interrupted at any time at the will of the operator preferably by commanding display of the correlation definitions, detected at 408 and executed at 409. These definitions can than be overridden at 410, if desired, by branching to 304 of FIG. 3. Comparison should then be reinitiated by re-entering the comparison process at "B", as described above. When all comparisons have been completed, as detected at 415, the loop is exited and the send routine may be initiated at 411.

As a preferred variation of the invention, and with slight variation of the mail service provided by the network, receiving terminal or as shown at 70 of FIG. 1, the operation of the invention for reporting of COD data can be speeded greatly. If an acknowledgement function capable of returning transmitted parameters in the same manner as the sender address is included, all the information to be operated upon by statistical log 130 can be appended to the e-mail message and transmitted therewith. To add this to the message, either default data (e.g. as a special case) or the actual data accessed during the comparison can be added to the message, preferably as part of the distribution identifier address (DIA) or the sender address (as part of the UDI), at 406, 407. At the receiving terminal, when a COD message is generated, the additional information is preferably added in the same fashion as the UDI and addressee user ID, as will be understood by those skilled in the art in view of this disclosure.

This variation of the invention thus avoids a second access to address directory 50 by storing the information at the time of the first access to the data and thus significantly reduces processing and memory access overhead. Transmission of this data with the message also has the benefit of distributing the storage of the data (which can be large when the distribution list for a message is large) over all addressee nodes or terminals and does not significantly increase the amount of data transmitted over the network. Further, the storage is maintained no longer than necessary at any location in the network. When a COD is received containing the information, the information is recognized by the reception manager 120 and forwarded through the correlation service 140 (which sorts it by UDI for correlation with the correct message) to the statistical log 130 over the connection illustrated by dashed arrow 210.

Alternatively, to avoid transmission or retransmission (and modification of the mail service) the data can be stored locally, attached to a DIA or UDI, at the sender terminal store 80 or preferably directly in the statistical log 130 or the presentation manager 110 (over the connection shown by dashed arrow 200). When a COD message is received, the correlation service 140 may directly access all the information the user has defined (directly or by default) as a block accessed in accordance with the user ID of the addressee over connection 210 or 210', depending on the location where the data is stored. While this alternative would require memory access and the use of potentially large amounts of local storage, multiple accesses of address directory 50 and correlation processing would be avoided.

Figure 5:
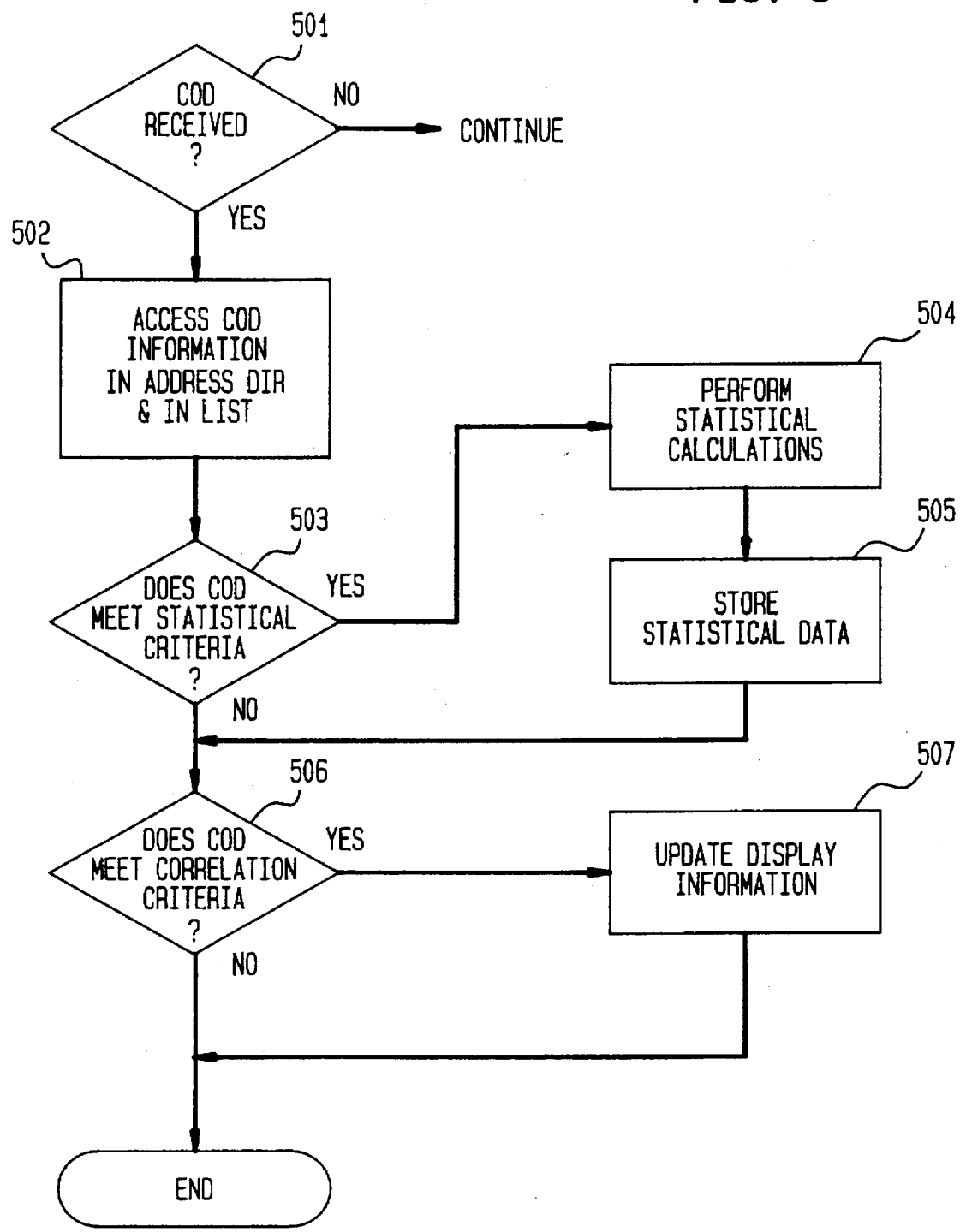
FIG. 5 is a flow diagram illustrating the operation of the invention upon receipt of a COD acknowledgement by the sender.

Referring now to FIG. 5, the response of the system of FIG. 2 to a received COD will be discussed. The fact that the invention operates in the background of terminal 10 is indicated by 501 only branching upon the receipt of a COD. Unless the enhanced display in accordance with the invention is being viewed when the COD arrives, the operator will be unaware of any processing of a COD or the storage of data reflecting the statistical contribution of the COD to the accumulating COD data.

When a COD arrives, an entry is made in the In List 24 which corresponds to the distribution list (e.g. out list 22) augmented by nested distribution lists at addressee terminals. The UDI or file name is communicated by the reception manager 120 if recognized as an acknowledgement of an e-mail message for which an enhanced display presentation has been defined, over connection 190 to the correlation service 140 to access (502) information from the address directory 50 unless this is avoided by the preferred variation of the invention discussed above. If it is then recognized that the COD meets statistical criteria (e.g. it is not a special case excluded therefrom), the statistical calculations (e.g. accumulation and defined calculations) are performed at 504 in statistical log 130 and the results stored at 505 in storage means 80, having been communicated to the sender processor 10 over connection 180. If the COD meets correlation criteria, the display information is updated at the presentation manager 110 (e.g. switching of attributes at statistical thresholds) at 507. Thus all calculations and display data are kept in a current state and may be rapidly called for display.

Figure 6:
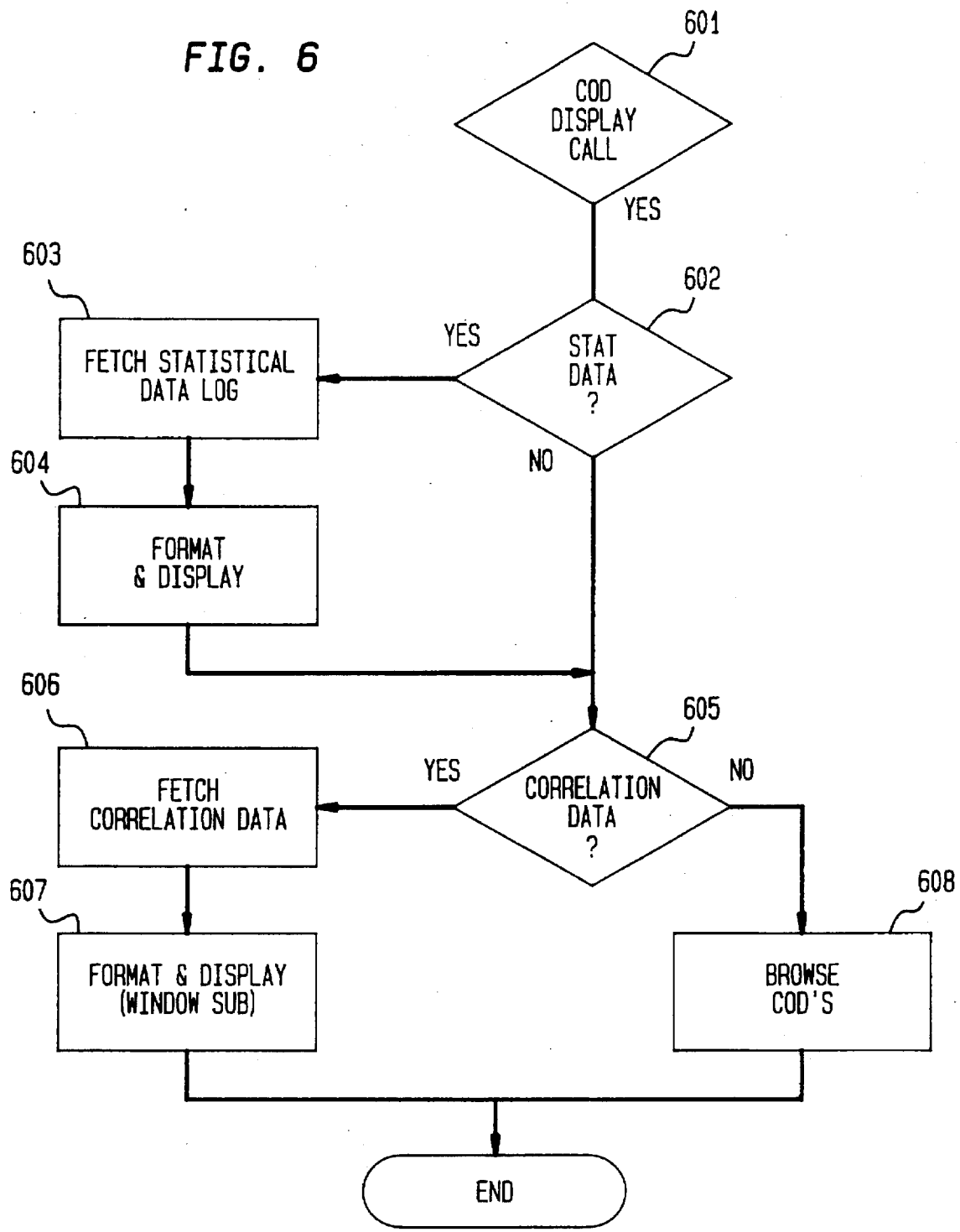
FIG. 6 is a flow diagram illustrating control of the display by the presentation manager.
Figure 7:
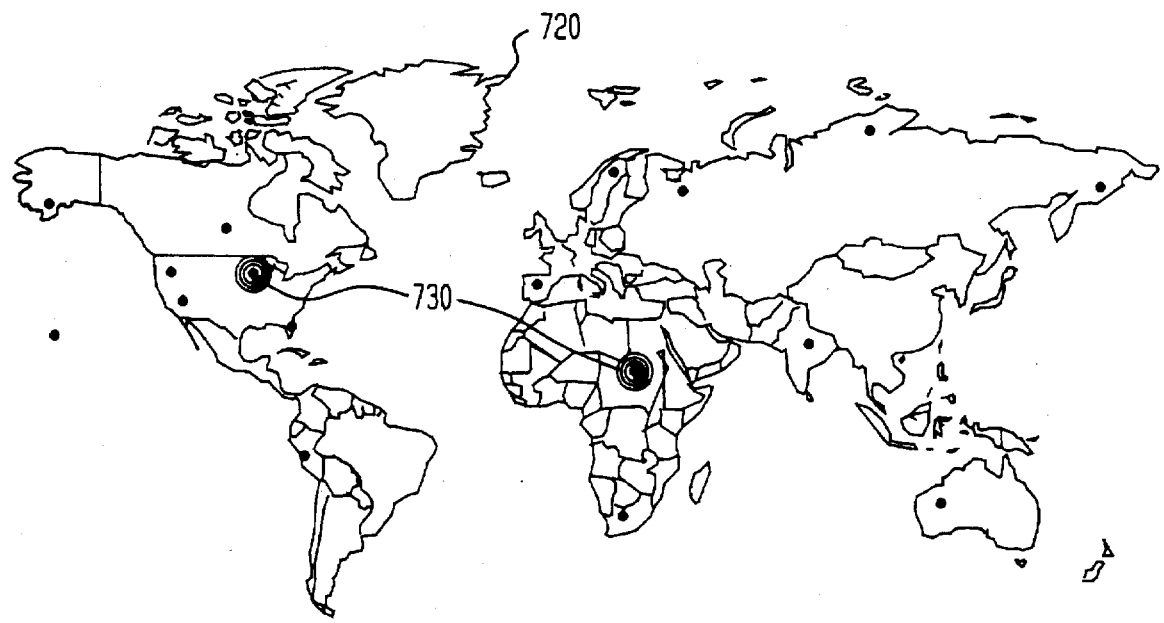
FIGS. 7 and 8 represent displays including exemplary templates, icons and overlay windows.
Figure 8:
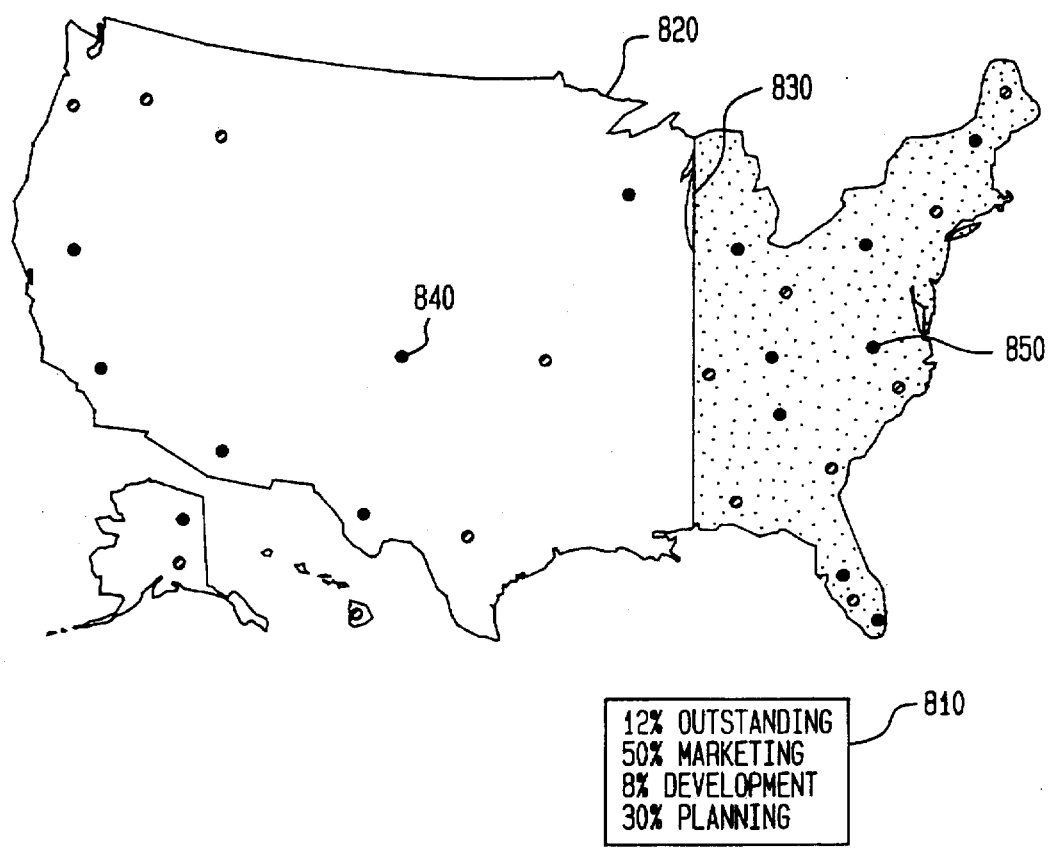

Referring now to FIG. 6, the response of the invention to a call for display of COD information by the operator 601 is shown. For convenience, this call is preferably the same as is used in the standard mail program (e.g. an "open the mail" command). However, by providing for detection of a statistics flag SF in the in list 24 (FIG. 1), a window such as 810 of FIG. 8 including a user defined statistical summary is displayed by fetching the statistical data at 603 from storage means 80 into statistical log 130 and controlling (604) the display through the presentation manager 110. This is preferably a summary of all messages and superimposed on a list of all outgoing e-mail. This list of outgoing e-mail is then preferably used as a menu for calling statistical summaries of COD data for individual messages. Upon exiting from this screen after selecting an individual message, the existence of correlation definitions for that message is detected at 605 and a correlation display including a template such as 720 of FIG. 7 or 820 of FIG. 8 is displayed by fetching correlation data at 606 into statistical log 130 and again formatting and displaying the information (607) by the presentation manager 110. If correlation data is not present, however branching to 608 at 605 allows the terminal to perform in the same manner as without the presence of the invention to allow the operator to browse the COD data.

Figure 9:
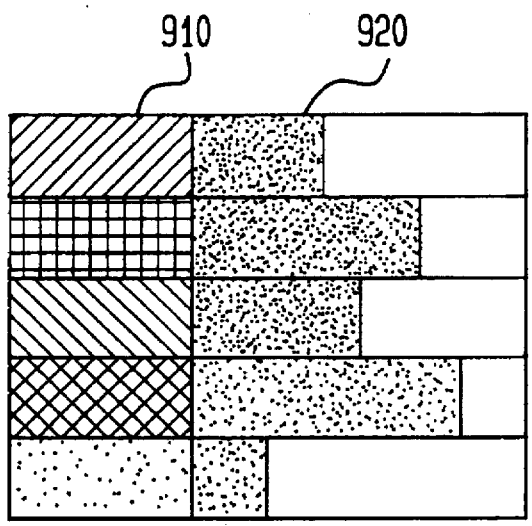
FIGS. 9 and 10 are exemplary icons illustrating the nature of information presented in accordance with the invention.
Figure 10:
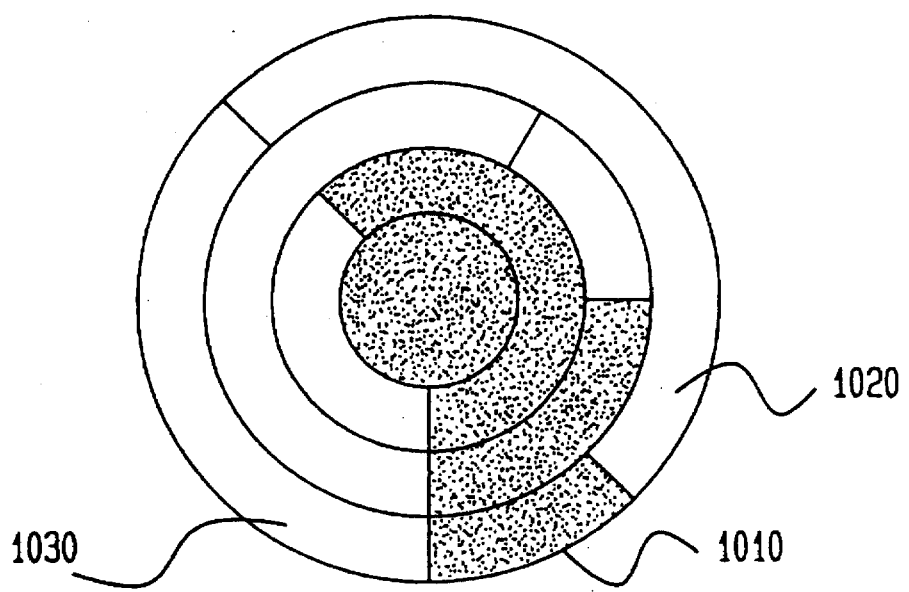
Figure 11:
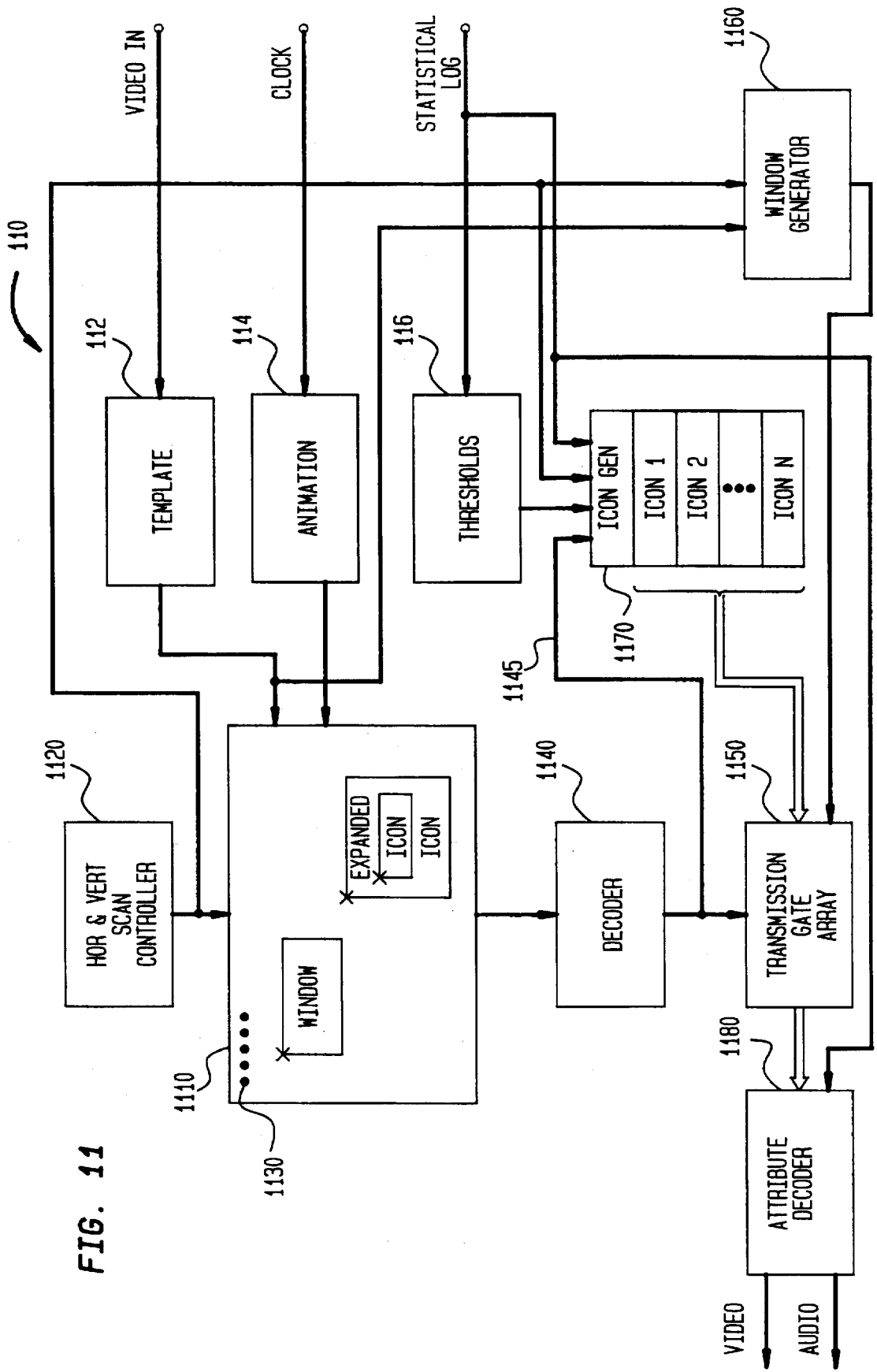
FIG. 11 is a block diagram of the presentation manager in accordance with the invention.

The production of the displays exemplified by FIGS. 7 and 8 and including the exemplary icons such as those shown in FIGS. 9 and 10 will now be discussed with reference to FIG. 11 which schematically represents an exemplary embodiment of presentation manager 110. The presentation manager is preferably implemented with a video bit map 1110 which will provide one or more bits for each pixel (e.g. 1130) of the display which are read out in synchronism with the raster scan of display 90 in accordance with scan controller 1120. In the particular embodiment shown, it is preferable that the display map contain at least three or four bits per pixel to provide control of image and background attribute of each of two video states for each of the template 112 and animation 114 generators (two bits) and a third bit to control superimposing of windows and icons. Windows are preferably differentiated from icons with a fourth bit or by the manner in which their addresses are specified: the icon addresses are user-defined, as described above, while the window locations are specified as part of the template in order to limit interference with the template image. Since it is expected that the template image will be invariant and the animation image change only periodically, is in desirable to merge both video images in the video map 1110.

An example of animation which may be provided is shown at 830 of FIG. 8 which provides shading over part of the template image in order to indicate, say, normal business hours in order to assist the operator in understanding differences in COD response between the locations represented for example, by icons 840 and 850. This type of animation is done simply by setting animation image bits in the video bit map 1110 above a time-related address therein in the horizontal direction. Video bit addresses in the vertical direction are preferably specified in accordance with the template or decoder in accordance therewith by video decoder 1140 using the template video bit to toggle a flip-flop for each address in the horizontal direction. The output of each flip-flop would then be used to gate (e.g. with an AND gate) the animation bit to limit the animation attribute to areas bounded by the template image.

Assuming, for simplicity, that four bits are used for each pixel in the video bit map 1110, windows and icons are overlaid on the template and animation images by the third and fourth video bits read out from each pixel 1130 of the video bit map. Scanning addresses are supplied to each of window generator 1160 and icon generator 1170, which will generate appropriate video signals to be read out as icon and window locations are scanned. It should be noted in this regard, that the window address is supplied to the window generator 1160 from the template store 112. Icon addresses are stored in the icon generator 1170 concurrently with storage of control bits in the video map 1110 when the display is defined, as discussed above with reference to FIG. 3. Also, if the convention is observed that windows and icons cannot be displayed at the same location, one combination of logical states is available to be decoded as a control over connection 1145 for the generation of expanded icon images which can be toggled on and off while the enhanced display is being viewed, preferably under control of the mouse 85' by any of a variety of techniques. A representative visual effect is shown in combination with a template at 730 of FIG. 7.

The particular construction of window generator 1160 and icon generator 1170 is not important to the practice of the invention and suitable arrangements can easily be provided in either hardware, software or a combination thereof by those skilled in the art, in view of this specification. The window generator need only provide storage for user defined legends to identify the statistical computations defined as described with reference to FIG. 3. The icon generator preferably includes a bit map for each icon to be displayed and storage for archetype icons which are user selectable for each icon location defined at step 306 of FIG. 3. Individual pixel video values are specified by a logical combination of the numerical values supplied by the statistical log 130, thresholds 116 for respective values and category information which corresponds to particular areas such as category identifier area 910 and histogram area 920 of FIG. 9 or overlaid pie chart portions 1010, 1020, 1030 of FIG. 10 (which could be used to indicate different stages of transmission status (e.g. red prior to reception by nodes of the network, yellow to indicate the percentage of addressees to which the message is accessible and green for the percentage of addressees who have accessed the message)) within each icon.

Similarly, the construction of attribute decoder 1180 is not important or even necessary to the practice of the invention but provides the convenience of altering display attributes to improve visibility without changing display definitions. It is also desirable to provide for a direct input from the statistical log so that user definable inputs therefrom may be used to override other inputs, such as special colors or audio indications for particular data such as completion of COD returns for a particular message or particular addressees.

In view of the foregoing, it is seen that the present invention provides a flexible and easily used enhancement for presentation of COD data which is user definable and can operate in the background of a user terminal. The use of color coded icons, together with templates and animation presents information in a form which is readily assimilated by a user.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. In combination,
    a network of data processing terminals, said network being capable of transmitting messages between respective ones of said terminals and including means for generating confirmation of delivery messages in response to a request therefor from a sender of a said message and to accessing of said message by a recipient,
    a source of information concerning users of said network, said information including information corresponding to a plurality of categories,
    a correlation service means for accessing information concerning users of said network from said source of information in response to data identifying a said recipient of said message contained in one of said confirmation of delivery messages,
    means for accumulating information, by categories, accessed from said source of information,
    means for performing computations on said accumulated information to derive a summary thereof, and
    means for providing a summary of said accumulated information at a terminal of said network in accordance with said categories.

2. The combination as recited in claim 1, further including a presentation manager means for associating attributes with respective ones of said categories of said information accessed from said information source.

3. The combination recited in claim 2, further including means for defining a correspondence between said attributes and said categories of information.

4. The combination as recited in claim 3, further including means for detecting a confirmation of delivery message for which a correspondence between said attributes and said categories of information has been defined, and
    means, responsive to said means for detecting, for controlling operation of said means for accumulating information.

5. The combination as recited in claim 2, wherein at least one of said attributes corresponds to an audible output of one said terminal of said network.

6. The combination as recited in claim 1, further including means for displaying a template image, and
    means for defining a position for display of an image representing information accumulated by said means for accumulating information.

7. The combination as recited in claim 6, wherein said image representing information accumulated by said means for accumulating information is in the form of a window superimposed on said template image.

8. The combination as recited in claim 6, wherein said image representing information accumulated by said means for accumulating information is in the form of an icon superimposed on said template image.

9. The combination recited in claim 6, further including means for merging display of time-related information with said template image.

10. A method of displaying a summary of confirmation of delivery information to an operator of a terminal of a network capable of selectively transmitting messages between respective terminals connected by said network and generating confirmation of delivery messages in response to an access to a message transmitted between terminals of said network, said method comprising the steps of
    accessing information concerning users of said network in response to contents of at least one said confirmation of delivery messages identifying a user of said network accessing a said message,
    accumulating, by category information, accessed by said accessing step, performing at least one calculation on said data accumulated by said accumulating step, and generating at least one of a visual display and an audible indication to an operator in response to information accumulated by said accumulating step as a summary of said accumulated information.

11. The method of claim 10, including the further steps of defining an association of an attribute for controlling said generating step with a category of said information accessed by said accessing step, and detecting the association defined by said defining step.

12. The method as recited in claim 10, wherein said generating step includes the further step of generating at least one of a window and an icon in response to information accumulated by said accumulating step.

13. A method of displaying a summary of confirmation of delivery information to an operator of a terminal of a network capable of selectively transmitting messages between respective terminals connected by said network and generating confirmation of delivery messages in response to an access to a message transmitted between terminals of said network, said method comprising the steps of accessing information concerning users of said network in response to a distribution list for a message, attaching said information to a distribution identifier address of said message, accumulating said information attached to said distribution identifier address by said attaching step as confirmation of delivery messages are received, performing at least one calculation on said data accumulated by said accumulating step, and generating at least one of a visual display and an audible indication to an operator as a summary of confirmation of delivery messages in response to information accumulated by said accumulating step.

14. The method of claim 13, including the further steps of defining an association of an attribute for controlling said generating step with a category of said information accessed by said accessing step, and detecting the association defined by said defining step.

15. The method as recited in claim 13, wherein said generating step includes the further step of generating at least one of a window and an icon in response to information accumulated by said accumulating step.

* * * * *